United States Patent
Saito et al.

(10) Patent No.: US 6,275,941 B1
(45) Date of Patent: Aug. 14, 2001

(54) SECURITY MANAGEMENT METHOD FOR NETWORK SYSTEM

(75) Inventors: Yoko Saito, Kawasaki; Michihiro Shimizu, Yokohama; Manabu Ikeuchi, Kanagawa-ken, all of (JP)

(73) Assignee: Hiatchi, Ltd., Tokyo (JP)

( * ) Notice: Subject to any disclaimer, the term of this patent is extended or adjusted under 35 U.S.C. 154(b) by 0 days.

(21) Appl. No.: 09/048,986

(22) Filed: Mar. 27, 1998

(30) Foreign Application Priority Data

Mar. 28, 1997 (JP) .................................................. 9-076954
Jun. 30, 1997 (JP) .................................................. 9-173532

(51) Int. Cl.$^7$ .................................................. G06F 11/00
(52) U.S. Cl. ........................... 713/201; 713/175; 713/182
(58) Field of Search ................................... 713/201, 182, 713/175

(56) References Cited

U.S. PATENT DOCUMENTS

| 5,475,758 | * | 12/1995 | Kikuchi | 713/168 |
| 5,659,616 | * | 8/1997 | Sudia | 713/176 |
| 5,687,235 | * | 11/1997 | Perlman et al. | 713/175 |
| 5,689,566 | * | 11/1997 | Nguyen | 713/182 |
| 5,706,349 | * | 1/1998 | Aditham et al. | 713/182 |
| 5,706,427 | * | 1/1998 | Tabuki | 713/201 |
| 5,715,314 |   | 2/1998 | Payne et al. . | |
| 5,737,419 | * | 4/1998 | Ganesan | 713/182 |
| 5,748,735 | * | 5/1998 | Ganesan | 713/182 |
| 5,757,920 | * | 5/1998 | Misra et al. | 713/182 |
| 5,778,065 | * | 7/1998 | Hauser et al. | 713/182 |
| 5,784,463 | * | 7/1998 | Chen et al. | 713/182 |
| 5,841,970 | * | 11/1998 | Tabuki | 713/201 |
| 5,850,442 | * | 12/1998 | Muftic | 713/182 |
| 5,872,848 | * | 2/1999 | Romney et al. | 713/168 |
| 5,948,064 | * | 9/1999 | Bertram et al. | 709/225 |
| 5,982,898 | * | 11/1999 | Hsu et al. | 713/175 |
| 5,999,711 | * | 12/1999 | Misra et al. | 713/201 |
| 6,092,196 | * | 7/2000 | Reiche | 713/200 |

FOREIGN PATENT DOCUMENTS

| 6-223041 | 8/1994 | (JP) . |
| 7-141296A | 6/1995 | (JP) . |
| 8-106437 | 4/1996 | (JP) . |

* cited by examiner

Primary Examiner—Thomas Lee
Assistant Examiner—NguyênñNguyên
(74) Attorney, Agent, or Firm—Antonelli, Terry, Stout & Kraus, LLP

(57) ABSTRACT

A plurality of application servers, a client, an integrated authentication server and a security information management server are connected to a network. A user having different combinations of user ID's and passwords or certificates for a plurality of kinds of services processed by the plurality of application servers makes requests for services to the individual application servers through the client by using a common integrated certificate. An application server receiving the integrated certificate from the client transfers it to the integrated authentication server. The integrated authentication server checks information of the security information management server to decide whether the right of the user to access the service is valid and when valid, transmits to the application server a combination of a user ID of the user and a password or a certificate concerning the service. The application server performs user authentication for the user on the basis of the combination of the user ID and the password or the certificate.

26 Claims, 12 Drawing Sheets

SECURITY MANAGEMENT METHOD FOR NETWORK SYSTEM

BACKGROUND OF THE INVENTION

The present invention relates to a security management method for a network having a client and severs, and more particularly, to a network system security management method which integrally manages a user and provides the single sign-on function of utilizing an integrated certificate for the user.

With a widespread use of the Internet, the market trend toward the security management has changed drastically. Especially when a wide area network system such as the Internet and an intra-enterprise network system (intranet) are combined together, the user authentication function and the function of controlling access to resources in the two network systems, by which the two networks can be integrated, have been sought. In other words, the integral management of a user and the centralized management of network resources which cover the two of the wide area network system and intra-enterprise network system have been desired.

As a method of integrally managing a user utilizing a wide area network system, a method as described in, for example, JP-A-6-223041 is known, according to which private information of a utilizer and utilization environment information are ciphered with a private key, a certificate issue server issues, as a certificate, the ciphered information to the utilizer and the utilizer logs in the system by utilizing this certificate. Further, as a security management method considering a distributed system, a method as described in, for example, JP-A-8-106437 is known in which when a user accesses a domain which is not a home domain of the user, a log-on certificate for certificating qualification authentication of the user is utilized. Further, JP-A-7-141296 discloses a system in which a TTP (Trusted Third Party) for managing security over a network domain is provided to perform setting and change of security policy of the overall network and access control based on the security policy is carried out.

Expectantly, the system for performing the user authentication and access control by utilizing the certificate as described above will come into wide use as one of security management systems for future wide area network systems. But when it comes to considering an actual network system, the existing enterprise network system has difficulties in shifting to a working which integrally utilizes a certificate issued by an external certificate authority and shifting to the security management based on the TTP. Namely, a method is desired which introduces a single sign-on scheme based on utilization of a certificate while preserving the existing user authentication scheme based on a user ID and a password.

SUMMARY OF THE INVENTION

An object of the present invention is to provide a security management method which facilitates shifting of the existing user authentication scheme based on a user ID and a password to the single on-sign based on utilization of an integrated certificate.

Another object of the present invention is to provide a security management method for wide area network system which can afford to perform user authentication by using a single integrated certificate in connection with different service requests made by the same user.

According to the present invention, in a security management system for a network system in which a client, an application server and an integrated authentication server can communicate with each other through a network, the client makes a service request by transmitting information of an integrated certificate to the application server. The application server transfers the information of the integrated certificate to the integrated authentication server to request the integrated authentication server to confirm the integrated certificate. The integrated authentication server confirms the integrated certificate and checks a user for the right to access the application server, and if valid, the integrated authentication server transmits a user ID and a password to the application server and the application server performs user authentication based on the user ID and the password.

In place of the confirmation of the integrated certificate by the integrated authentication server, the integrated certificate may be confirmed by the application server. In that case, when the application server has confirmed the integrated certificate, the application server transfers the information of the integrated certificate to the integrated authentication server to make a request for a user ID and a password to the integrated authentication server. The integrated authentication server checks the user for the right to access the application server and if valid, the integrated authentication server transmits the user ID and the password to the application server. After that, the application server may perform user authentication based on the user ID and the password.

In the present invention, the client may transmit a user ID and a password to the application server to initially make a service request, and the application server may transfer the user ID and the password to the integrated authentication server. In that case, the integrated authentication server may check the user for the right to access the application server and if valid, the integrated authentication server may prepare a temporal integrated certificate and transmit it to the client via the application server. A security management method may be adopted wherein when the user subsequently makes a service request, the temporal integrated certificate is transmitted to the application server.

Preferably, in the present invention, the results of security check, including a result of the confirmation of the integrated certificate which is executed by the integrated authentication server and application server while the client initially logs in the system and finally logs off the system, a result of checking the right to access the application server, a result of authentication of the user ID and password, and a result of checking the right to access data held by the application server, may be recorded as access history information in the client and the application server. For example, the integrated authentication server can record as access history information the result of the confirmation of the integrated certificate and the result of the security check including checking the right to access the application server, and access conditions of the user can be checked by collating the access history information recorded in the client with the access history information recorded in the integrated authentication server.

Further, the process of the above method to be executed on the integrated authentication server side can be carried out by executing a computer program implemented on a storage medium readable by the integrated authentication server.

When the same user possesses a plurality of certificates for user authentication in respect of a plurality of transactions, a certificate corresponding to a transaction can be down-loaded from the authentication server to the user in response to inputting of the integrated certificate by the user and authentication of a communication partner and ciphering of communication can be realized on the basis of information of the certificate.

According to the present invention, in a security management method for, for example, a network system in which a client, an application server or a communication partner and an integrated authentication server can communicate with each other through a network, the client transmits information of an integrated certificate to the integrated authentication server to request the integrated authentication server to authenticate a user of the client. In response to a request for communicating with an application of the application server or the communication partner made by the client, the integrated authentication server checks the right to access and if valid, the integrated authentication server transmits a certificate of the transaction to an entity concerned in communication and the client ciphers a communication message to the application server or the communication partner by using key information which is inherent to the client and which paired with the information of the certificate. The application server or the communication partner confirms the client on the basis of the information of the certificate, decodes the communication message and ciphers a communication message to the client by using key information which is inherent to the application server or the communication partner and which paired with the information of the certificate. The client confirms the application server or the communication partner on the basis of the information of the certificate and decodes the communication message.

In place of down-loading of the certificate of an entity concerned in communication by the integrated authentication server, the entity concerned in communication may manage the certificate and may make a request for a certificate revocation list to the integrated authentication server so that when the client makes a communication request, the client may check the validity of the certificate of the application server or the communication partner on the basis of information of the certificate revocation list. If the validity is determined by the checking, the client ciphers a communication message to the application server or the communication partner by using key information which is inherent to the client and which paired with the information of the certificate. The application server or the communication partner confirms the client on the basis of the information of the certificate, decodes the communication message and ciphers a communication message to the client by using key information which is inherent to the application server or the communication partner and which paired with the information of the certificate. The client may confirm the application server or the communication partner on the basis of the information of the certificate and may decode the communication message.

According to the present invention, while the application server and the database server preserve the conventional user authentication and access control based on a user ID and a password, the function of single sign-on utilizing the integrated certificate can be provided to the user. Even for a user not having the integrated certificate, the single sign-on can be realized by issuing a temporal integrated certificate. Further, the client cooperates with the integrated authentication server, thereby ensuring that access conditions of the user can be supervised so as to exclude a user who is in problematic access conditions from the system.

In a closed network such as an enterprise network connected to a wide area network, single sign-on can be realized while maintaining security of high degree. Further, when a user uses certificates in respect of individual service transactions, single sign-on can be realized by authenticating the user by means of the integrated certificate and the user need not manage a certificate in respect of each service transaction.

DESCRIPTION OF THE PREFERRED EMBODIMENTS

An embodiment of the present invention will be described hereunder with reference to the drawings.

Figure 1:
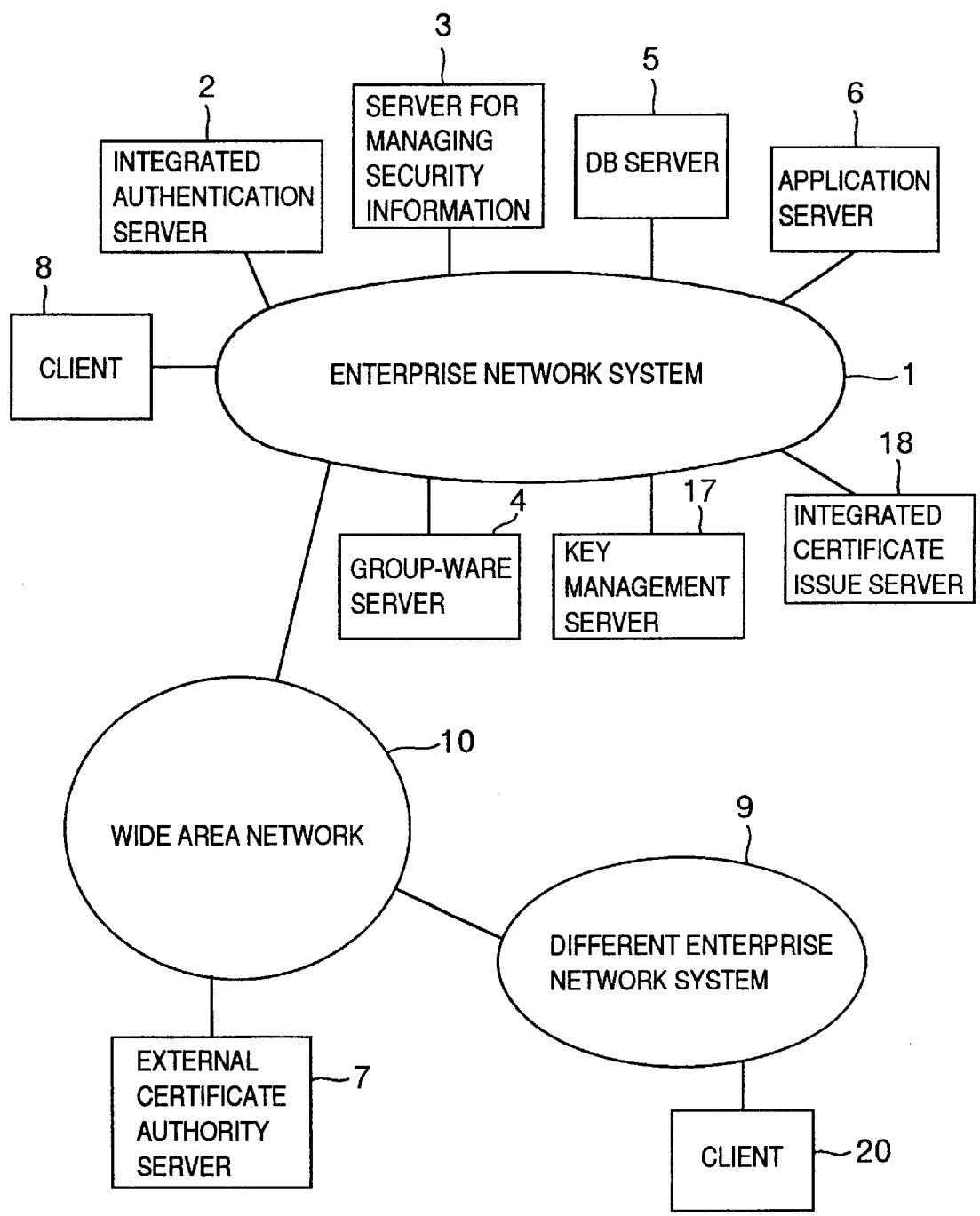
FIG. 1 is a diagram showing the construction of a network system according to an embodiment of the present invention.

FIG. 1 is a diagram showing the construction of a network system according to an embodiment of the present invention. A wide area network 10 such as the Internet is connected with an enterprise network system (intranet) 1 and a different enterprise network system 9.

The enterprise network system 1 is connected with a client 8 (only one is illustrated in the figure but there are plural ones) and besides, connected with an integrated authentication server 2, a server 3 for managing security information, a database (DB) server 5, an application server 6, a group-ware server 4, a key management server 17 and an integrated certificate issue server 18.

The DB server 5 and the application server 6 are servers which are accessed from the client 8 and utilized for service processing. The group-ware server 4 is a server which sends an initial service menu picture to the client 8, sends an electronic mail to the client 8 and manages the schedule of a user. The server 3 is a server which integrally manages security information including information for controlling the access to the DB server 5 and the application server 6 and user's access control information inclusive of authentication information such as a user ID and a password. The integrated authentication server 2 is a server which checks the right of the user to access the DB server 5 and the application server 6 by confirming an integrated certificate sent from the client 8 and acquiring the security information from the server 3. The key management server 17 is a server which generates a master key used in cipher communication within the enterprise network system 1.

The wide area network 10 is connected with an external certificate authority server 7. The external certificate authority server 7 is a server which issues an external certificate in accordance with a predetermined procedure. The integrated certificate issue server 18 is a server which issues an integrated certificate to a user who has no external certificate in accordance with a request from the integrated authentication server 2. A so-called directory server may otherwise have the information of the server 3. The client 8 and the various servers are information processing units each including a personal computer and a work station. Further, by executing computer programs implemented on storage media readable by the client 8 and the various servers, the processes of the client 8 and the various servers to be detailed hereinafter can be carried out.

It is considered that information of an integrated certificate of a user is inputted from the client 8 or a client 20 connected to the different enterprise network system 9 and is logged in, for example, the DB server 5. In that case, the DB server 5 or the integrated authentication server 2 confirms the integrated certificate and the integrated authentication server 2 acquires security information from the server 3 to check the right of the user to access the DB server 5. If the right to access is authorized, authentication information such as a user ID and a password is sent to the DB server 5 and the DB server 5 carries out the user's authentication process for the user by using the conventional user ID and password. When the user subsequently logs in the application server 6 after the user has completed the service process utilizing the DB server 5, the client 20 automatically transmits to the application server 6 the already inputted integrated certificate and carries out the above procedure, thus realizing single sign-on.

For a user who has no integrated certificate, an integrated certificate is issued through the conventional log-in effected by inputting a user ID and a password and thereafter, each time that the service process shifts from one to another, the client 20 transmits the integrated certificate to a particular application server, thereby permitting single sign-on.

Figure 2:
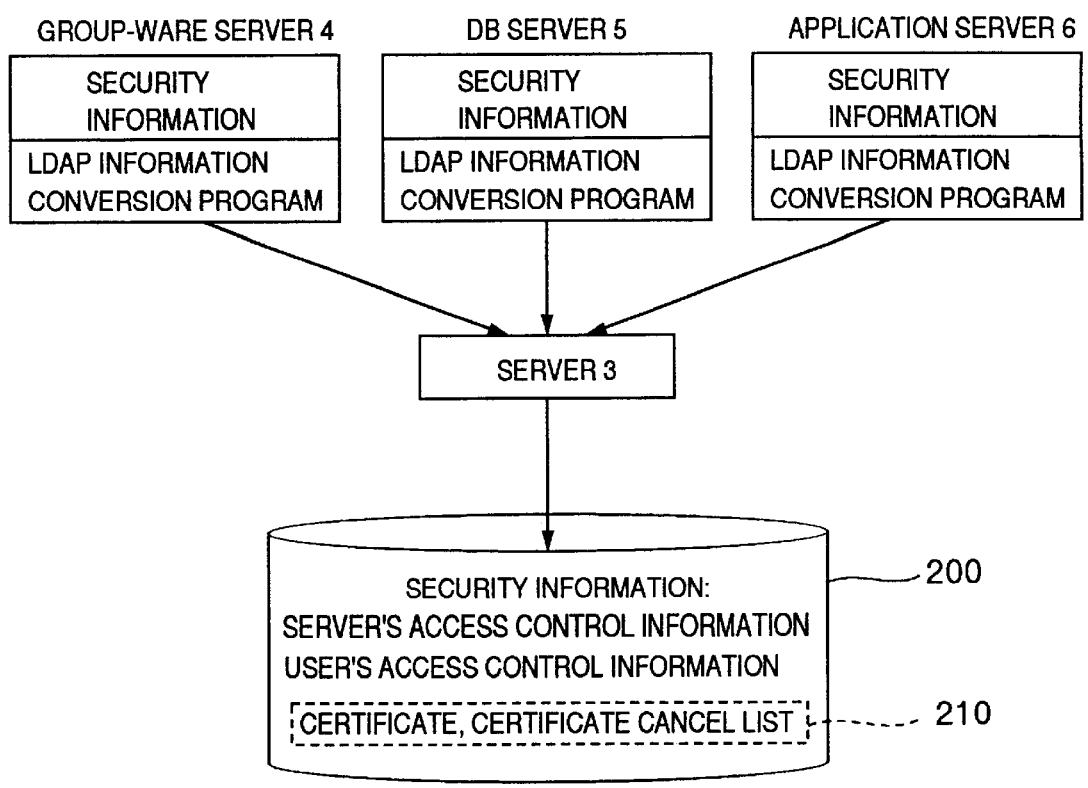
FIG. 2 is a diagram for explaining a scheme in which a server 3 integrally manages security information in the embodiment shown in FIG. 1.

FIG. 2 is a diagram for explaining a scheme in which the server 3 for managing security information integrally manages the security information. Security information concerning users and resources (documents, databases, terminal units, application programs and so on) managed by individual servers before the server 3 is introduced is converted into an LDAP format by means of an LDAP information conversion program and sent to a storage unit 200 of the server 3 so as to be managed integrally by the server 3. The LDAP (Lightweight Data Access Protocol) referred to herein is directory access protocol of IETF standards. Denoted by 210 is information used in an embodiment shown in FIG. 13.

Figure 3:
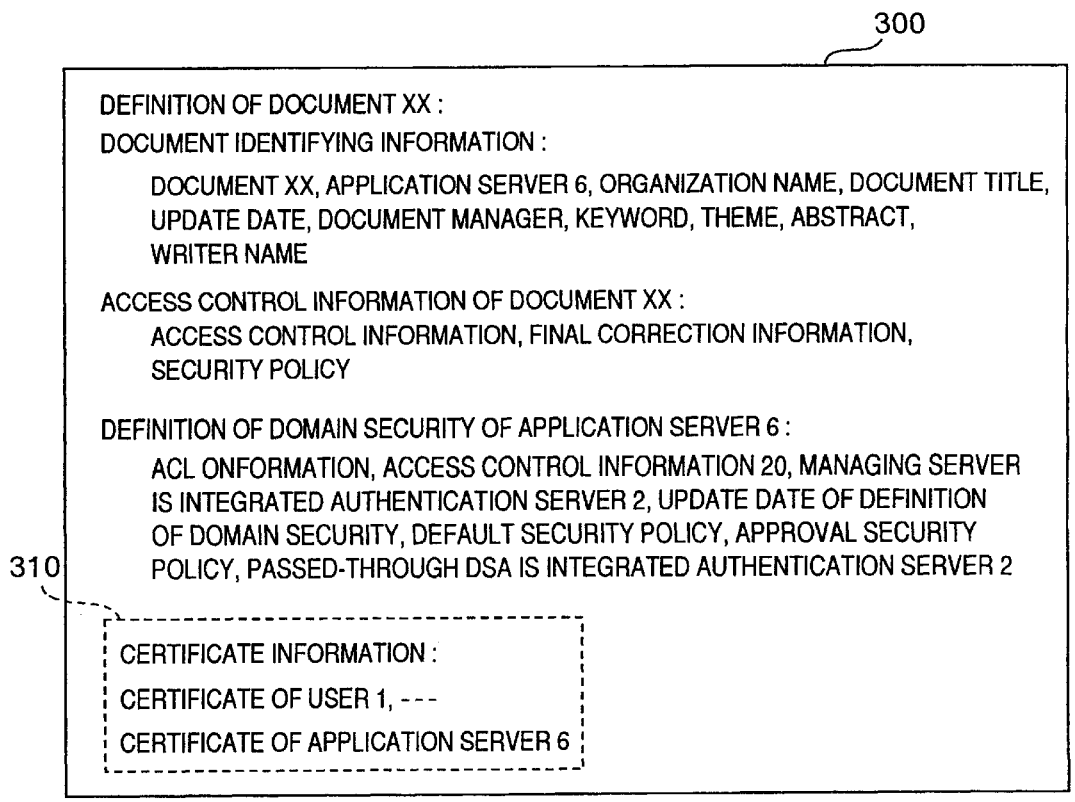
FIG. 3 is a diagram showing an example of information of LDAP format.

FIG. 3 is a diagram showing, as an example of information of the LDAP format, a format of information 300 for definition of a document and application server's access control. The definition of document is comprised of document identifying information and document's access control information. The document identifying information is comprised of an identifier of a document, an identifier of a server which manages this document, an organization name, and information about the document (title of the document, update date of the document, document manager, keyword for retrieval of the document, theme, abstract and writer name). On the other hand, the document's access control information includes access control information, final correction information and security policy. The access control information is information for controlling access to part of a document such as controlling access to a specified page in the document. The final correction information provides an update date of the access control information. The security policy is for setting an access level of a user who is permitted to access the document. A working is possible in which users of, for example, policy numbers 1 to 3 are permitted to access that document. The definition of document is information managed by the application server 6. Denoted by 310 is information used in embodiments shown in FIGS. 11 to 13.

As ACL (Access Control List) information of the application server, access information when the application server 6 is accessed, an identifier of a managing server of the access control information and an update date of definition of domain security are defined and as the security policy, a default security policy, an approved security policy and a passed-through DSA (Domain Security Authority) are defined. For the approved security policy, a working is possible in which users of, for example, policy numbers 1 to 5 are permitted to access the application server 6. According to the passed-through DSA, authentication of a user is so defined that it is necessarily done by way of the integrated authentication server 2. The access control information of the application server is information which is held by the server 3 and managed by the integrated authentication server 2.

In addition to the aforementioned access control information, access control information must be set also for a user who accesses the application server 6 to access a specified document. Set in the access control information of the user are information of an integrated certificate of the user, authentication information such as a user ID and a password, information concerning a department to which the user belongs and a user's title, and an access level (policy number) of the user. By setting the access level, a working is possible in which a user of a policy number of, for example, 4 is permitted to access the application server 6 but is not permitted to access a document "XXXX". Also, another working is possible in which users who are of higher titles than a certain title are permitted to access a specified document.

Figure 4:
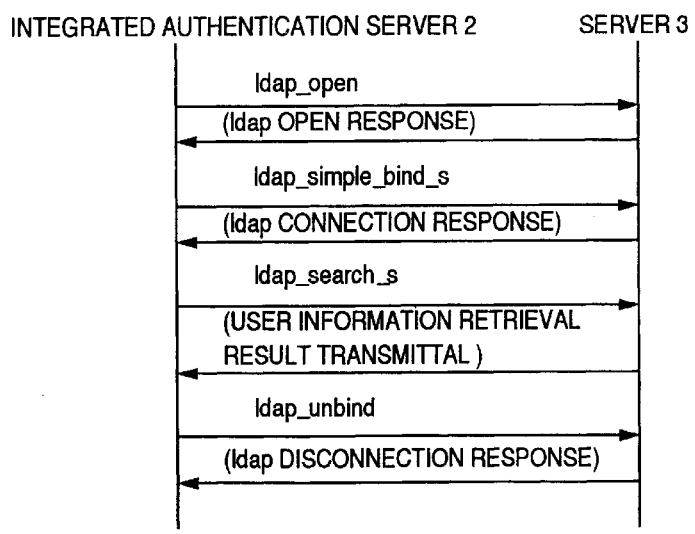
FIG. 4 is a diagram showing the procedure in which an integrated authentication server 2 acquires security information of a user from the server 3 in the embodiment shown in FIG. 1.

FIG. 4 is a diagram showing the procedure in which the integrated authentication server 2 acquires security information of a user from the server 3. The LDAP protocol is used for the procedure of acquiring the security information. The integrated authentication server 2 first establishes a LDAP connection to the server 3 through ldap_open and after performing mutual authentication between the integrated authentication server 2 and the server 3 through ldap_simple_bind_s, the integrated authentication server 2 transmits an integrated certificate number of the user and a user ID through ldap_search_s, thus causing the server 3 to transmit security information of the user to the integrated authentication server 2.

Figure 5:
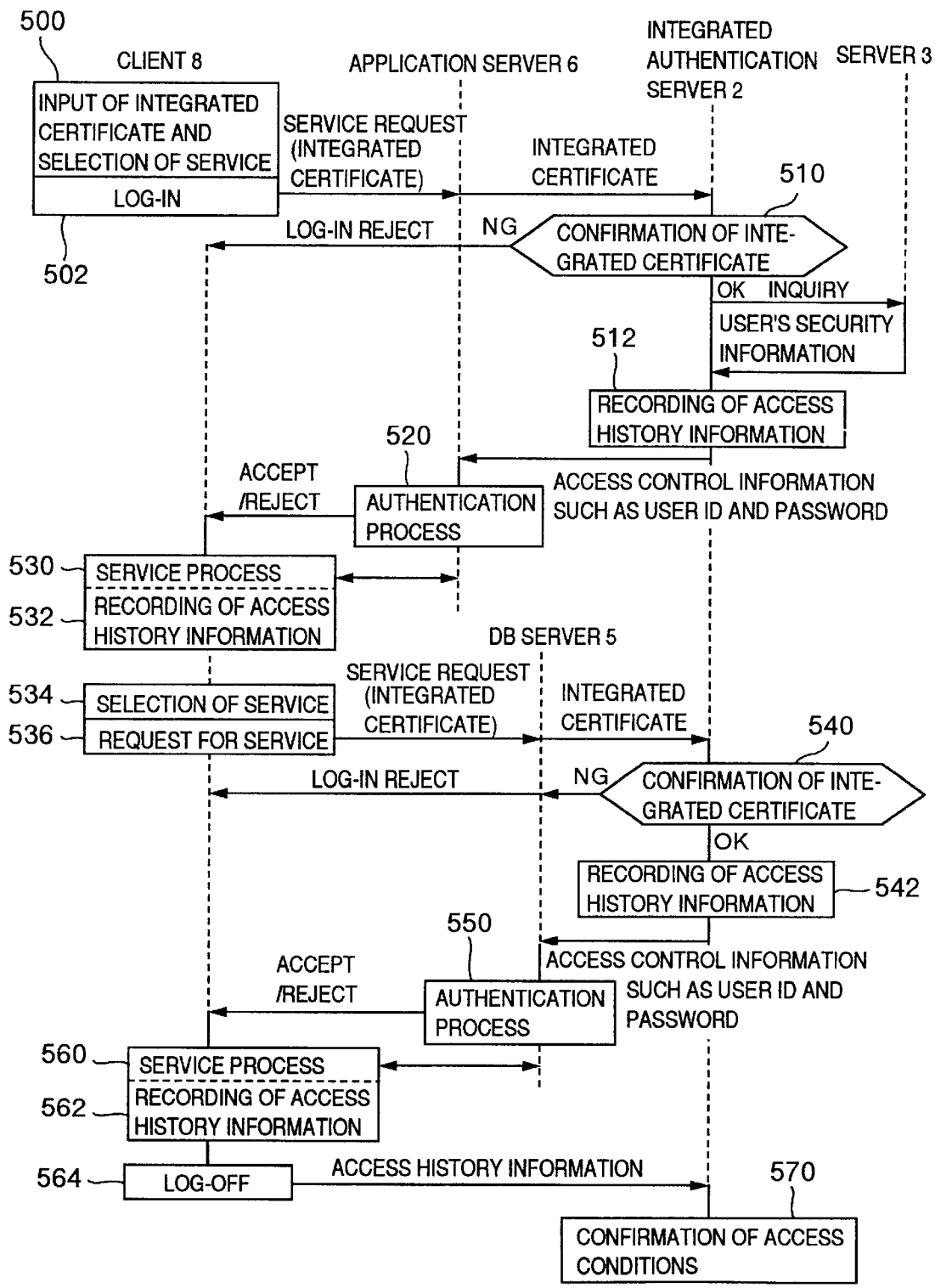
FIG. 5 is a diagram showing the processing procedure of single sign-on utilizing an integrated certificate in the embodiment shown in FIG. 1.

FIG. 5 is a diagram showing the procedure in which a user who performs an input operation to the client 8 initially logs in the enterprise network system 1 (step 502) and finally logs off (step 564). Here, the procedure will be described in which the user logs in by using an integrated certificate (inclusive of an external certificate).

The client 8 displays a service menu on a display unit of the client 8. When the user selects the application server 6 from the service menu (step 500), information of an integrated certificate is inputted to the client 8 from a storage medium such as an IC card of the user. The client 8 ciphers the information of the integrated certificate with a private key of the user to store the ciphered information in a storage unit of its own (not shown) and thereafter, transmits a service request and the contents of the integrated certificate ciphered with the private key of the user to the application server 6. The application server 6 transfers the information of the integrated certificate, as it is, to the integrated authentication server 2 to request the integrated authentication server 2 to confirm the contents of the integrated certificate.

After decoding the ciphered integrated certificate of the user with a public key of the user, the integrated authentication server 2 confirms the integrated certificate (step 510). Data structure of the integrated certificate is defined by X.509 to contain information such as owner's name, issuer, issuer's signature of issue originator and availability term. Since the signature is ciphered with a private key of the issuer, the integrated authentication server 2 first decodes this signature with a public key of the issuer and compares it with an original to confirm the validity of the integrated certificate. Subsequently, the contents such as availability term is confirmed. If the integrated certificate is invalid (NG in step 510), a log-in reject message is transmitted to the client 8 via the application server 6. If the integrated certificate is valid (OK in step 510), an inquiry is sent to the server 3 to obtain security information of the user. The procedure for this is the same as that described previously. The security information of the user is comprised of access control information of the application server 6 and access control information of the user. The integrated authentication server 2 compares an access level of the user with that of the application server 6 and if access to the application server 6 is permissible, the integrated authentication server records access history information to the effect that the access by the user is permitted in a storage unit (step 512) and transmits access control information of the user including ciphered user ID, password, access level and title information to the application server 6. When the application server 6 holds the user's access control information such as access level and title information corresponding to the user ID, transmission of access control information excepting the user ID and password is unneeded.

The application server 6 decodes the received access control information and first carries out the authentication process to decide whether the user ID and the password coincide with registered ones (step 520). If non-coincidence is determined, the access to the application server 6 is not permitted. If coincidence is determined, an accept message is transmitted to the client 8. Thereafter, each time that a request for accessing a document is sent from the client 8, it is decided on the basis of access control information of the document, access level of the user and title information whether access to the document is permissible. The client 8 makes a request for accessing a document possessed by the application server 6 to carry out the service process (step 530). During the service process, the client 8 records access history information for the accessed document in the storage unit (step 532).

After the service process related to the application server 6 has been completed, the service menu is again displayed on the display unit of the client 8. If the user subsequently selects the DB server 5, the client 8 reads the stored integrated certificate of the user and automatically transmits it together with a service request to the DB server 5. Accordingly, the user is not required to again input the information of the integrated certificate. The DB server 5 transfers the information of the integrated certificate to the integrated authentication server 2 to request the integrated authentication server 2 to confirm the contents of the information. Thereafter, similarly to the above, the integrated authentication server 2 decodes the ciphered integrated certificate with the public key of the user and then carries out confirmation of the integrated certificate (step 540), records a result of the confirmation of the integrated certificate and access history information to the effect that access by the user to the DB server 5 is permissible/impermissible (step 542) and transmits the access control information to the DB server 5.

The DB server performs the authentication process for the user by using the user ID and password (step 550). If the access by the user is permitted, it is then decided on the received access control information whether access to designated database, table and a series of tables is permissible. The client 8 carries out the service process by utilizing the DB server 5 (step 560) and during the service process, records access history information for the accessed database (step 562).

When the service process is completed in this manner and the user inputs log-off (step 564), the client 8 sends the recorded access history information to the integrated authentication server 2 and removes the information of the integrated certificate held on the storage unit. The integrated authentication server 2 compares the received access history information with the access history information recorded by the integrated authentication server 2 to check whether the access is valid (step 570).

If, in the processing procedure of FIG. 5, the client logs in the group-ware server 4 instead of initially logging in the application server 6, a similar processing procedure holds.

Figure 6:
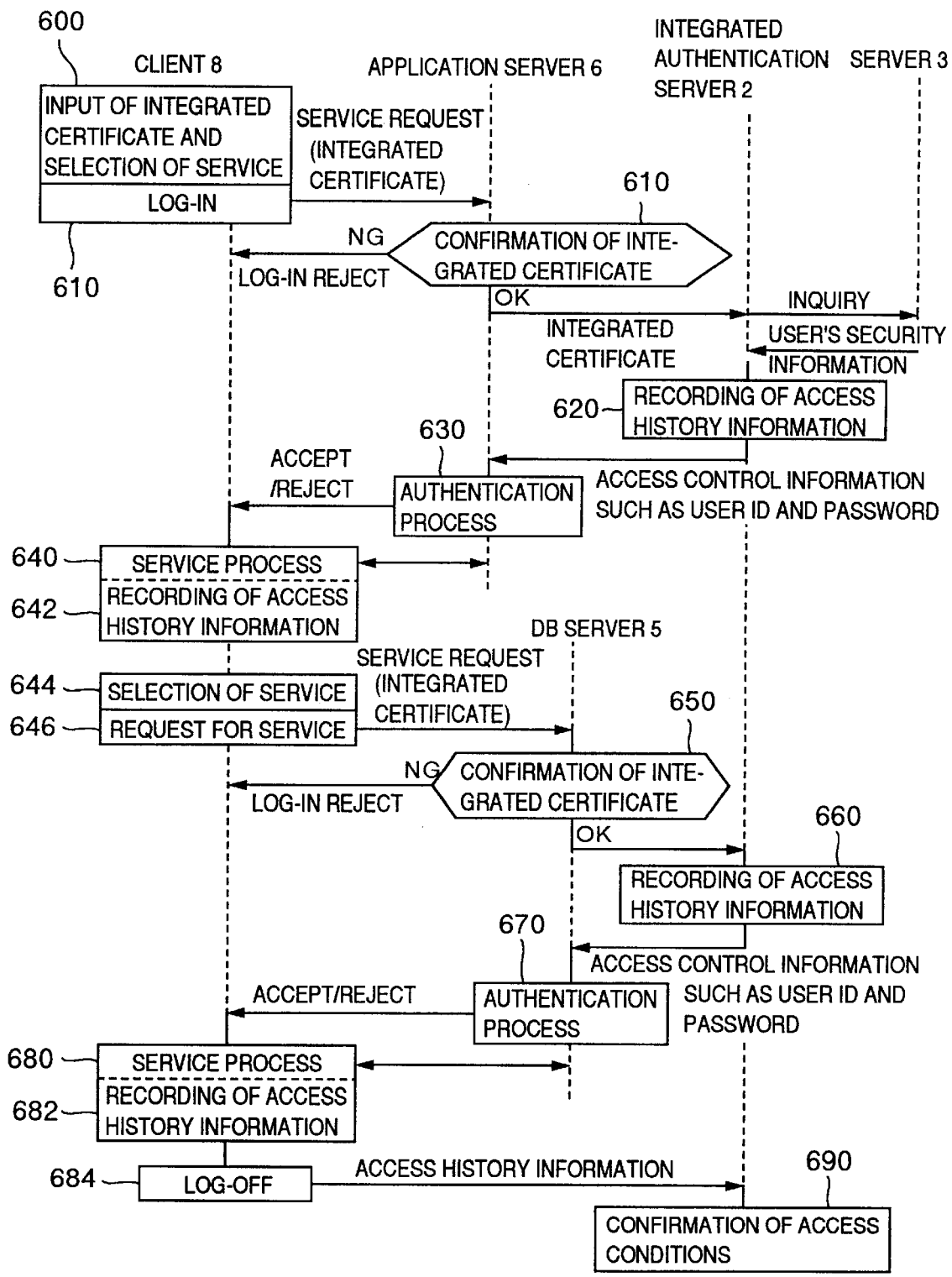
FIG. 6 is a diagram showing the processing procedure in which in place of the integrated authentication server 2, a DB server 5/application server 6 confirms the integrated certificate in the processing procedure of FIG. 5.

FIG. 6 is a diagram showing the processing procedure when the application server 6 and the DB server 5 have by themselves the function of confirming the contents of the integrated certificate. The procedure of FIG. 6 differs from that of FIG. 5 in that in place of the integrated authentication server 2, each of the application server 6 and DB server 5 decodes an integrated certificate ciphered with a private key of a user by using a public key of the user and thereafter confirms the integrated certificate. It is to be noted that in order for each application server to confirm the contents of the integrated certificate, the server must have the function of acquiring a public key of an issuer of the integrated certificate and verifying an issuer's signature. Excepting the above, the processing procedure is substantially the same as that of FIG. 5 and will not detailed.

Figure 7:
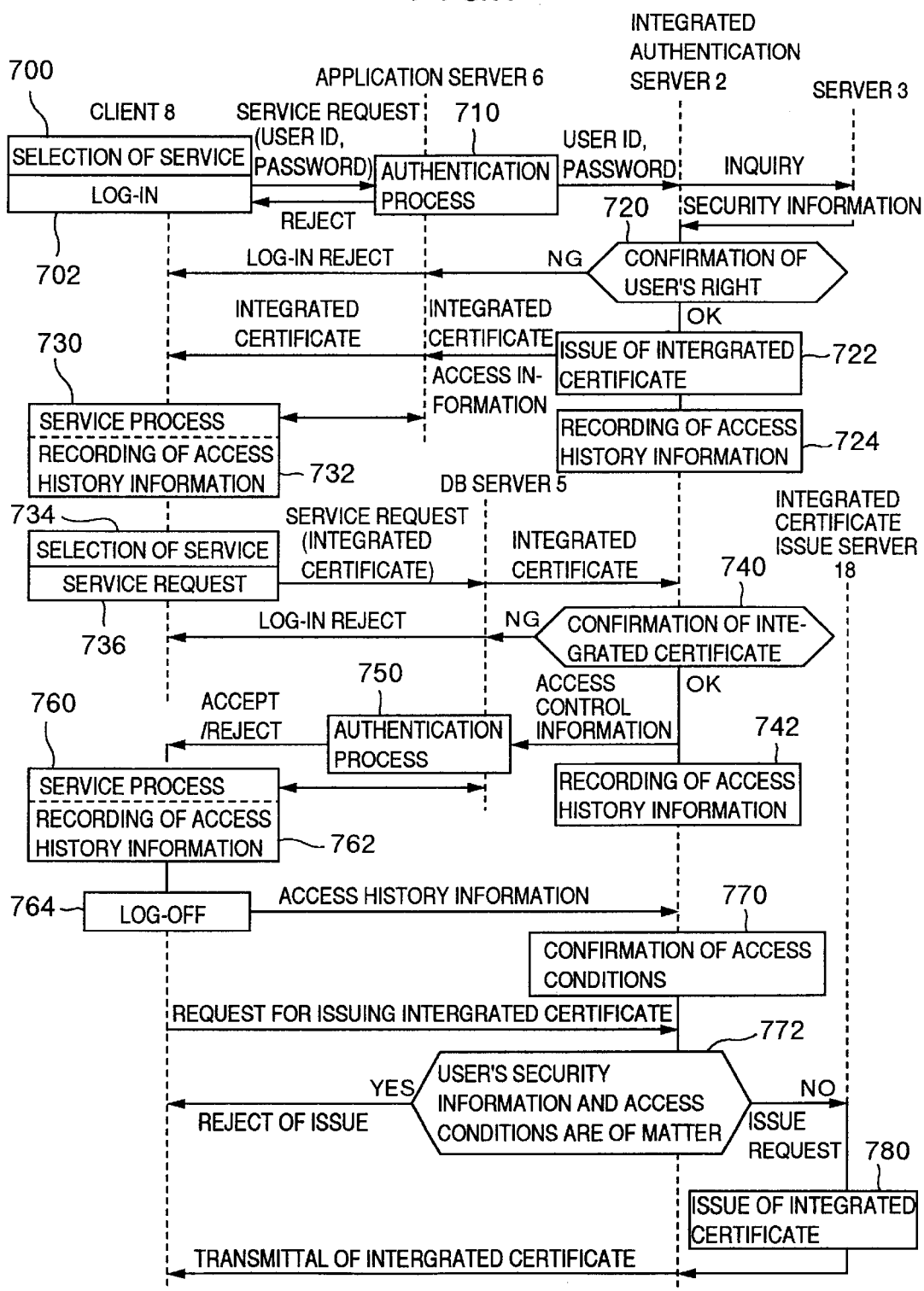
FIG. 7 is a diagram showing the processing procedure of single sign-on conducted by a user not possessing a certificate in the embodiment shown in FIG. 1.

FIG. 7 is a diagram showing the processing procedure in which a user not possessing an integrated certificate initially logs in the enterprise network system 1 (step 702) and finally logs off the enterprise network system (step 764). When the user selects the application server 6 from a service menu at the client 8 (step 700) and inputs a user ID and a password, the client 8 transmits a service request, the user ID and the password to the application server 6. The application server 6 performs the authentication process to decide whether the received user ID and password coincide with registered ones (step 710). If non-coincident, access to the application server 6 is rejected. If coincident, the application server 6 sends the received user ID and password to the integrated authentication server 2. The integrated authentication server 2 makes an inquiry to the server 3 by sending the user ID and password to obtain security information of the user.

Next, the integrated authentication server 2 checks whether the user has the right to access the application server 6 through the aforementioned check process based on the security information received from the server 3 (step 720). If the user does not have the right (NG in step 720), a log-in reject message is transmitted to the client 8. If the user has the right (OK in step 720), an integrated certificate is issued (step 722). This integrated certificate is issued with the aim of permitting temporary access to the application server 6 and therefore its valid term is shorter than that of the usual integrated certificate (for example, a day's integrated certificate) and the right to access the application server 6 is also limited. Subsequently, the integrated authentication server 2 transmits the integrated certificate and access control information of the user such as access level and title information to the application server 6. When the application server 6 holds the access control information, the transmission of the access control information is unneeded. The application server 6 transmits the received integrated certificate to the client 8.

After storing the received integrated certificate in the storage unit, the client 8 makes a request for accessing a document held by the application server 6 to perform the service process (step 730). Each time that the application server 6 receives a request for accessing a document from the client 8, the application server 6 decides, on the basis of access control information of the document, access level of the user and title information, whether the access to the document is permissible. During the service process, the client 8 records access history information for the accessed document (step 732). The client 8 periodically checks the availability term of the integrated certificate and gives an alarm to the user when the term expires.

The service process related to the application server 6 is completed in this manner. After that, when the user newly selects the DB server 5, the client 8 reads the stored integrated certificate and transmits it to the DB server 5, together with a new service request. The DB server 5 sends the information of the integrated certificate to the integrated authentication server 2 to request the integrated authentication server to confirm the contents of the integrated certificate. The integrated authentication server 2 confirms the integrated certificate in the manner described above (step 740) and transmits the access control information inclusive of the user ID and password to the DB server 5. The DB server 5 carries out, for the client 8, the authentication process based on the user ID and password (step 750) and if valid, access to the DB server 5 is permitted.

Subsequently, the client 8 transmits a request for accessing a database to the DB server 5 as described previously and the DB server 5 decides on the basis of the user's access control information whether the access to the database is permissible. The client 8 performs the service process by utilizing the DB server 5 (step 760) and during the service process, records access history information for the accessed database (step 762). When the service process is completed in this manner and the user inputs log-off (step 764), the client 8 sends the recorded access history information to the integrated authentication server 2 and removes the held information of integrated certificate. The integrated authentication server 2 compares the received access history information with access history information recorded by the integrated authentication server 2 to decide whether the access is valid (step 770). If the user subsequently makes a request for issuing the integrated certificate as part of the log-off procedure, the client 8 transmits this request to the integrated authentication server 2. The integrated authentication server 2 checks whether the security information and access conditions of the user are of matter (step 772). Namely, if log-in permission is not recorded in the access history information available after the integrated authentication server 2 has confirmed the right of the user, it of course matters. Further, if, in spite of the absence of a record of subsequent permission of access to the DB server 5, access history information on the side of client 8 has a record of access to the DB server 5, it matters. Further, if a case that access is not permitted when the client 8 accesses a document of the application server 6 and a database of the DB server 5 is recorded in access history information on the side of client 8, it matters. When there occurs a problem (YES), the integrated authentication server 2 transmits to the client 8 a message to the effect that issue of an integrated certificate is not permitted. If there occurs no problem (NO), the integrated authentication server 2 transmits a request for issuing an integrated certificate to the integrated certificate issue server 18, the integrated certificate issue server 18 issues an integrated certificate (step 780) and transmits it to the integrated authentication server 2, and the integrated authentication server 2 transmits this integrated certificate to the client 8.

The client 8 delivers the received integrated certificate to an external recording medium such as an IC card or a floppy disk. Thereafter, the user is permitted to carry out the log-in procedure using the integrated certificate as shown in FIG. 5. In this manner, according to the present embodiment, even the user not possessing the integrated certificate can realize single sign-on through one log-in operation. It is preferable that the integrated authentication server 2, application server 6 and DB server 5 should support both the processing procedure shown in FIG. 5 and the processing procedure shown in FIG. 7 in combination.

Figure 8:
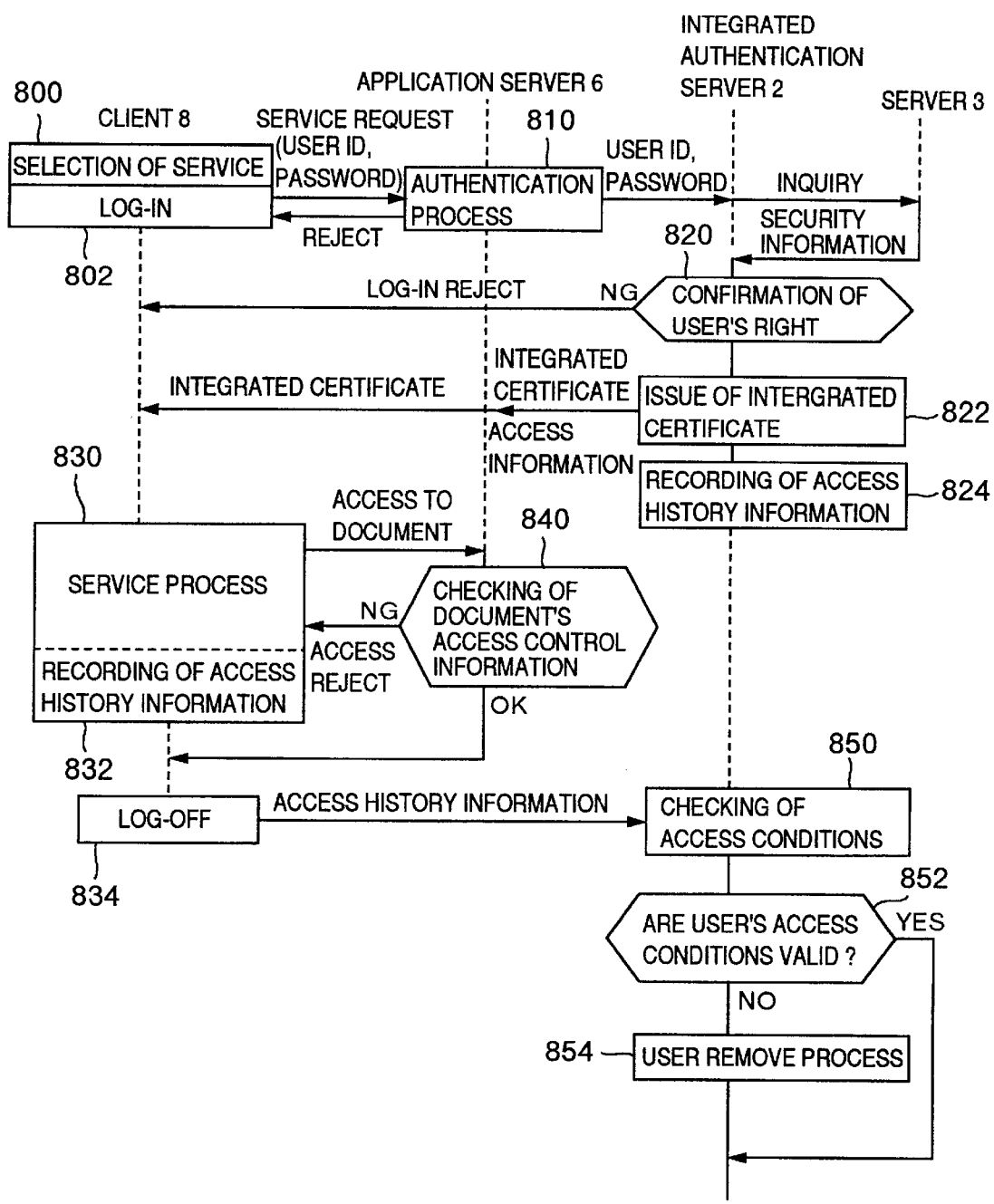
FIG. 8 is a diagram showing the processing procedure in which the integrated authentication server 2 supervises access conditions of a user to detect security violation in the embodiment shown in FIG. 1.

FIG. 8 is a diagram showing the processing procedure in which the integrated authentication sever 2 supervises access conditions of a user to detect security violation. The client 8 cooperates with the integrated authentication server 2 to check access conditions of the user, thus ensuring that security violation upon a system can be detected.

In an example of FIG. 8, a situation is depicted in which when a request for accessing a document is made while the client 8 accesses the application server 6 and performs the service process (step 830), the application server 6 checks the access on the basis of the access control information of the user and access control information of the document (step 840), and if the access reject is proven to be invalid, a message of access reject is returned to the client 8. The client 8 records the access reject in access history information (step 832). When the client 8 instructs log-off (step 834), the access history information for that user recorded by the client 8 is transmitted to the integrated authentication server 2. The integrated authentication server 2 decides, on the basis of the access history information collected by the integrated authentication server 2, the access history information collected by the client 8 and collation of the two, whether the access conditions of the user is valid (steps 850 and 852). If it is determined that the user makes invalid access or unauthorized access (NO), the integrated authentication server 2 carries out the process for removing the user's access control information (step 854).

For example, the following cases are enumerated as invalid access or unauthorized access by the user.

(a) Log-in accept is not recorded in the integrated authentication server 2. Namely, the result of confirmation of the integrated certificate indicates log-in reject.

(b) In spite of the fact that the integrated authentication server 2 checks and confirms the user's right and as a result access to the application server is not permitted, the client 8 accesses the application server.

(c) The result of the authentication process effected by the application server or the DB server indicates access reject.

(d) The client 8 detects that the availability term of the integrated certificate expires.

(e) The client 8 tries to access impermissible document and database.

(f) Processing times related to security which are recorded in the access history information, including time that the client 8 inputs the integrated certificate, time that log-in is instructed, time that the integrated authentication server 2 confirms the integrated certificate and time that the application server 6 authenticates the user to permit access to the application server 6, are not in correct sequence of time series.

According to the present embodiment, since the integrated authentication server 2 and server 3 integrally manage the security information including access control information of the user and access control information of the application server, the security information can be registered and updated in centralized fashion and in contrast to the prior art, individual application servers need not manage security information individually.

Figure 9:
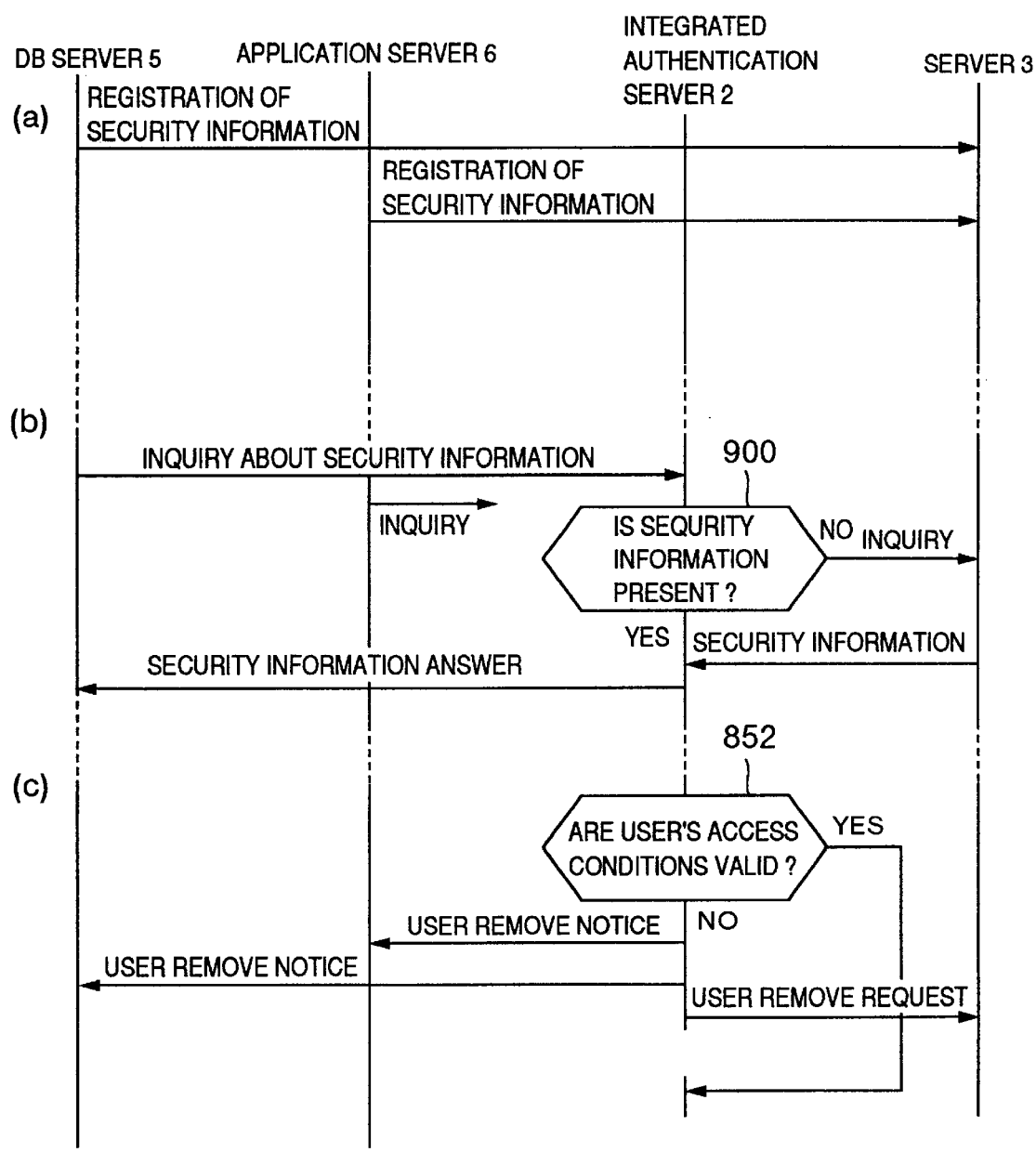
FIG. 9 is a diagram for explaining the process for managing security information in the embodiment shown in FIG. 1.

FIG. 9 is a diagram showing the procedure of registration, reference and update of security information. FIG. 9 shows at (a) the processing procedure at the phase of registration of security information. When each server requests the server 3 to register security information, the server 3 registers the requested security information in the storage unit. At that time, the existing security information can be converted into the LDAP format by utilizing the LDAP information conversion program as described previously.

FIG. 9 shows at (b) a diagram showing the procedure of reference to security information. Each server inquires the integrated authentication server 2 about security information. If the integrated authentication server 2 has already fetched security information concerning a designated user (YES in step 900), it answers the security information. If not fetched (NO in step 900), the integrated authentication server inquires the server 3 to acquire security information and then answers a request originator server. For example, this corresponds to the case where the application server 6 and DB server 5 shown in FIG. 6 transmit integrated certificate information to the integrated authentication server 2 to refer to security information. This also corresponds to the case where the application server 6 shown in FIG. 7 transmits the user ID and password to the integrated authentication server 2 to confirm the right of the user and issues an integrated certificate to receive access control information of the user.

FIG. 9 shows at (c) a diagram showing an example of update of security information. When the integrated authentication server 2 detects security violation by a user (NO in step 852), it informs each server of removal of the user. Also, integrated authentication server 2 requests the server 3 to remove access control information of that user.

The integrated authentication server 2 and the server 3 may not be separated but may be integrated to realize the present invention. The integrated authentication server 2, the server 3, the key management server 17 and the integrated certificate issue server 18 can also be realized with the same server.

Next, cipher communication among the client 8, servers 5 and 6 and integrated authentication server 2 will be described. In the event that a user steals the conventional user information especially password information on a communication line, the user impersonates another person on the basis of the stolen information to threaten security. In the present invention, a user is confirmed by using information of integrated certificate which may be published in essentiality and therefore if information of a private key of the user is tapped in addition to the information of the integrated certificate, there is a possibility that a wrong third person impersonates another person. Accordingly, communication among the client 8, servers 5 and 6 and integrated authentication server 2 must be done in the form of cipher communication after the communication partners have authenticated each other. Especially, since security information concerning a user is transmitted/received between each server and the integrated authentication server 2, the information must be protected such that only the person concerned can see the information. For example, as communication means for protecting security information, SSL (Secure Socket Layer) has been known.

For performing cipher communication, it matters that the key management such as generation, delivery and recovery of a cipher key is dealt with. Different management methods and realization methods are available depending on what ciphering means is used. Hereinafter, a ciphering technique based on a group key ciphering scheme which is one of ciphering schemes suitable for the present invention and is called Multi2 will be described.

Figure 10:
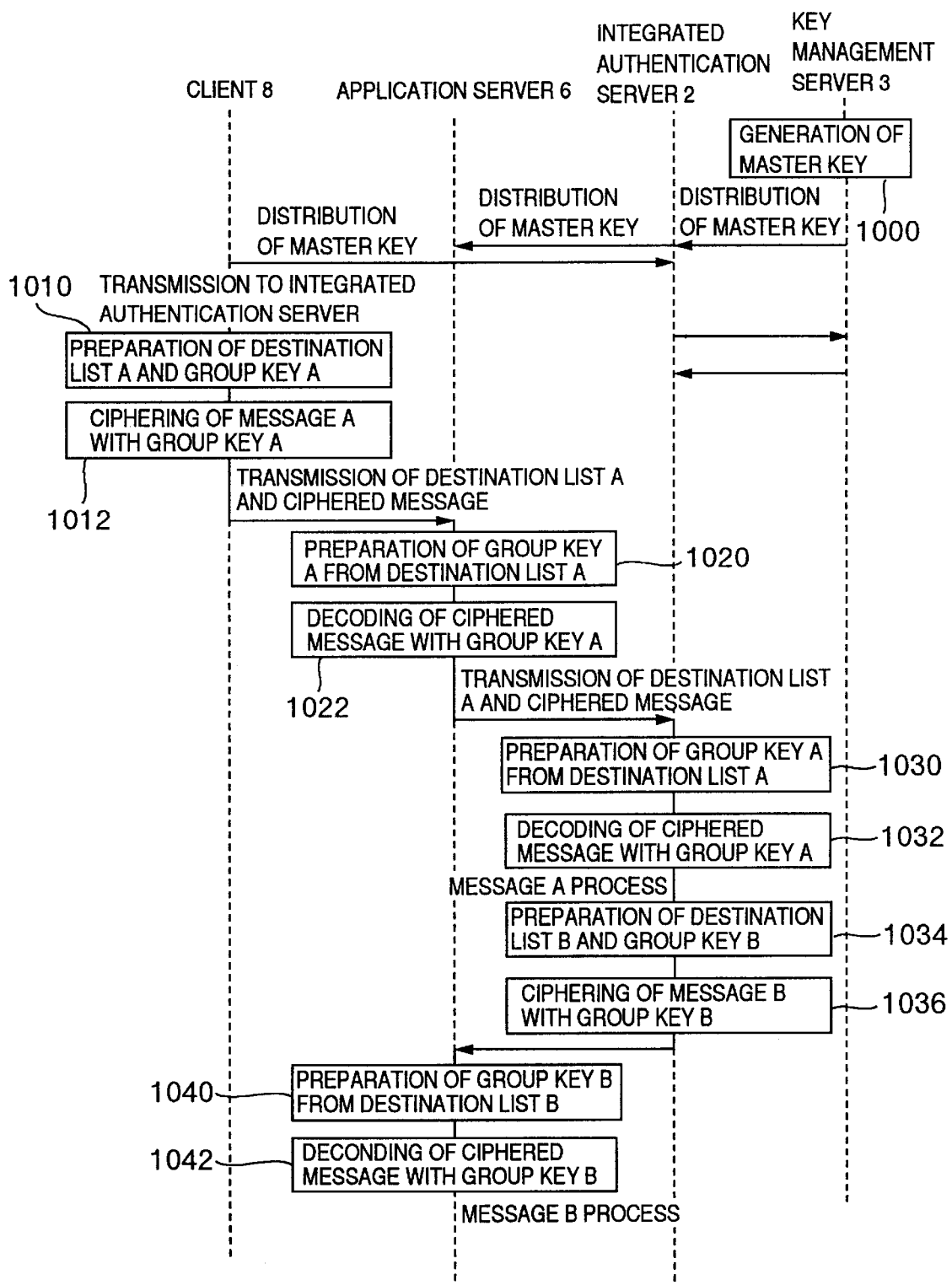
FIG. 10 is a diagram for explaining the procedure of the process of ciphering data with a group key.

FIG. 10 is a diagram for explaining the processing procedure of ciphering data by using a group key. The key manager 17 prepares and distributes master keys of the client and the server (step 1000). When a cipher key for ciphering a message is generated from the master key, partners (a plurality of partners may be designated) by which the message is desired to be read are registered in a destination list, a group key is dynamically prepared from the master key and the destination list (step 1010), and the message is ciphered with this group key (step 1012). In an example of FIG. 10, when transmitting a message A to the application server 6, the client 8 designates the client 8, the application server 6 and the integrated authentication server 2 in a destination list A. Then, the client does not transmit the group key A to the application server 6 but transmits only the ciphered message A and the destination list A. In order to decode the message A received from the client 8, the application server 6 dynamically prepares the group key A from the master key and the destination list A which is received together with the message A (step 1020). The application server 6 decodes the message A with the thus prepared group key A (step 1022). When the message A is transmitted from the application server 6 to the integrated authentication server 2, too, the group key A is prepared from the master key and the destination list A and a message A desired to be transmitted is ciphered with the group key A. Since the group key A is registered in the destination list A and can be prepared dynamically by only a partner having the master key, it is possible that only a partner by which the message A is desired to be read can be permitted to read the message A (steps 1030 and 1032).

Next, when the integrated authentication server 2 desires to transmit a message B to the application server 6, only the application server 6 is set in a destination list B, and the message B is ciphered with a group key B prepared from the master key and the destination list B (step 1034) and transmitted (step 1036). Even if the client 8 tries to decode this ciphered message, the client 8 cannot decode it because the client 8 is not recorded in the destination list B. In this manner, only the application server 6 is permitted to prepare the group key B (step 1040) and decode the message B. In the example of FIG. 10, the cipher communication based on the group key available between the client 8 and each server is described but each user can afford to possess a master key. In this case, the master key is stored in an IC card of each user and a group key can be generated in the IC card.

On the other hand, in recent electronic commercial transaction and communication, the authentication processing using a certificate based on a public key and the processing of ciphering communication have been taking the lead. Accordingly, it is frequent that only one user has many certificates.

The present inventors have considered that the management and working of a plurality of certificates themselves possessed by each user must be taken into account.

In another embodiment of the present invention to be described below, the security management for user authentication and the communication cipher processing is realized by down-loading a certificate and a certificate revocation list for each service on the basis of an integrated certificate.

The present embodiment will be described with reference to FIG. 1. When the client 8 or the client 20 connected to the different enterprise network system 9 logs in, for example, the DB server 5 by inputting information of an integrated certificate, the integrated authentication server 2 confirms the integrated certificate and acquires security information from the server 3 to check the right to access the DB server 5. If the right to access is valid, certificate information of entities concerned in communication is sent to the client 8 or 20 and the DB server 5 and the processing between the client 8 or 20 and the DB server 5 is initiated.

The client ciphers a communication message to the DB server 5 by using key information (hereinafter referred to as private key) which paired with the information of the aforementioned certificate and which is inherent to the client, and the DB server 5 confirms the client by using a public key of the client extracted from the aforementioned certificate and decodes the communication message.

In the DB server 5, too, a communication message to the client can be ciphered with a private key of the DB server 5 which paired with the information of the aforementioned certificate and in the client, the partner is confirmed by using a public key of the DB server 5 extracted from the aforementioned certificate and the communication message can be decoded.

In this manner, certificate information necessary for the transaction included in a plurality of certificates possessed by the user can be extracted from the information of the integrated certificate, validity of the certificate is confirmed by the latest certificate revocation list held by the integrated authentication server 2 and thereafter, the certificate is delivered to entities concerned in communication, thus ensuring that the entities concerned in communication are not required to manage the certificate.

Further, when the client subsequently logs in the application server 6, the certificate information of entity concerned in communication is sent from the integrated authentication server 2 to the client 8 or 20 and the application server 6, thereby realizing single sign-on.

Figure 11:
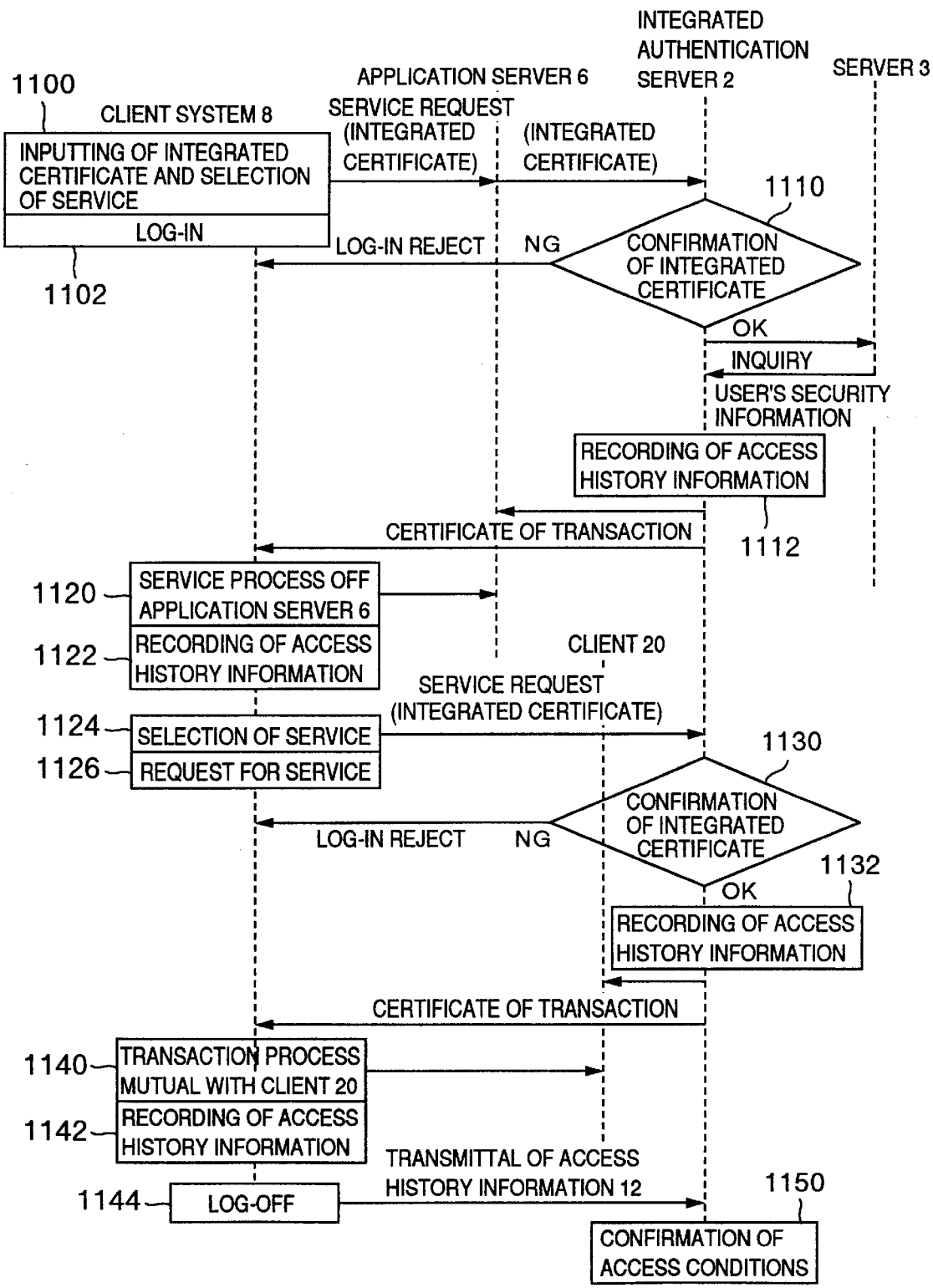
FIG. 11 is a diagram showing the processing procedure of single sign-on utilizing an integrated certificate according to another embodiment of the present invention.

FIG. 11 is a diagram showing the processing procedure in which the a user of the client 8 initially logs in the enterprise network system 1 (step 1102) and finally logs off it (step 1144). Here, the procedure in which the user logs in by using an integrated certificate will be described.

The client 8 displays a service menu on the display screen of the client 8. When a user selects the application server 6 from the service menu and inputs information of an integrated certificate from a private information storage medium such as an IC card (step 1100), the client 8 ciphers the information of the integrated certificate with a private key of the user, stores it in the storage unit of its own and then transmits a service request and the contents of the integrated certificate ciphered by the private key of the user to the integrated authentication server 2.

After decoding the information of the ciphered integrated certificate with a public key of the user, the integrated authentication server 2 confirms the integrated certificate (step 1110).

Data structure of the integrated certificate is prescribed by X.509 and includes information of owner name, issuer, issuer's signature and availability term.

The issuer's signature is ciphered with a private key of an issuer and therefore this signature is first decoded with a public key of the issuer and compared with an original so that the integrated certificate may be confirmed to be valid. Next, the contents such as the availability term is confirmed. If the integrated certificate is an unauthorized one (NG in step 1110), a log-in reject message is transmitted to the client 8. If the integrated certificate is an authorized one (OK in step 1110), user's security information is acquired by inquiring the server 3. The procedure for this has already been described previously. The user's security information is comprised of access control information of the application server 6, access control information of the user and certificates of the application server 6 and the user which are necessary for this service.

The integrated authentication server 2 compares an access level of the user with an access level of the application server 6 and if access to the application server 6 is permissible, extracts certificates of the application server 6 and user concerning the service and confirms the effectiveness of the certificates by confirming the latest certificate revocation list. If information pieces of the certificates of the two are effective, access history information to the effect that access by the user is permitted is recorded in the storage unit (step 1112) and the certificate information pieces of the two are transmitted. At that time, since the certificate information is transmitted while being ciphered with the public key of a recipient and hence conveniently, only a concerned entity having a private key is permitted to decode the certificate information.

The client 8 makes a request for accessing a document held by the application server 6 and performs the service process. Prior to this operation, the mutual authentication process is carried out, the procedure of which will be described with reference to FIG. 12. After the mutual authentication process has been completed, the client 8 is permitted to cipher data and transmit the data to the application server 6. The client 8 ciphers a message by using a session key which is negotiated during the authentication process effected mutually with the application server 6. This cipher process is carried out by the client 8 and therefore the user can be unconscious of this process. The ciphered message is decoded with a session key held by the application server 6 and can be read by only the application server 6. When a message is transmitted from the application server 6 to the client 8, cipher/decipher can be effected similarly using the aforementioned session key. Since a temporary key which is effective for only one time use is used as a typical session key, security of communication can be high.

Further, in the present embodiment, the session key is prepared on the sever side during the authentication process but it can also be prepared on the client side. Further, the preparation method of session key itself conforms to protocol sequence of each transaction.

During the service process (step 1120), the client 8 records access history information for the accessed document in the storage unit (step 1122).

After the service process related to the application server 6 has been completed in this manner, the service menu is again displayed on the display unit of the client 8. If the user then selects the electronic transaction process mutual with the client 20 (step 1124), the client 8 reads the stored integrated certificate of the user to automatically transmit it, together with a service request, to the integrated authentication server 2. Accordingly, the user need not input again the information of the integrated certificate.

Thereafter, similarly to the above, the integrated authentication server 2 decodes the ciphered integrated certificate with the public key of the user to subsequently confirm the integrated certificate (step 1130) and if the result of confirmation of the integrated certificate does not matter, access history information to the effect that access by the user to the electronic transaction process is accepted/rejected is recorded (step 1132).

When the integrated authentication server 2 permits the user's access, it confirms the client 8 about the validity of the certificates of the client 8 and the client 20 which is a transaction partner and then transmits the certificate information pieces to entities concerned in communication. The client 8 conducts the electronic transaction process mutually with the client 20 by using the information of the certificates (step 1140) and during the transaction process, records access history information (step 1142). When the process is completed in this manner and the user inputs log-off (step 1144), the client 8 sends the recorded access history information to the integrated authentication server 2 and removes the information of the integrated certificate held on the storage unit. The integrated authentication server 2 compares the received access history information with the access history information recorded by the integrated authentication server 2 to check whether the access is authorized one (step 1150).

Figure 12:
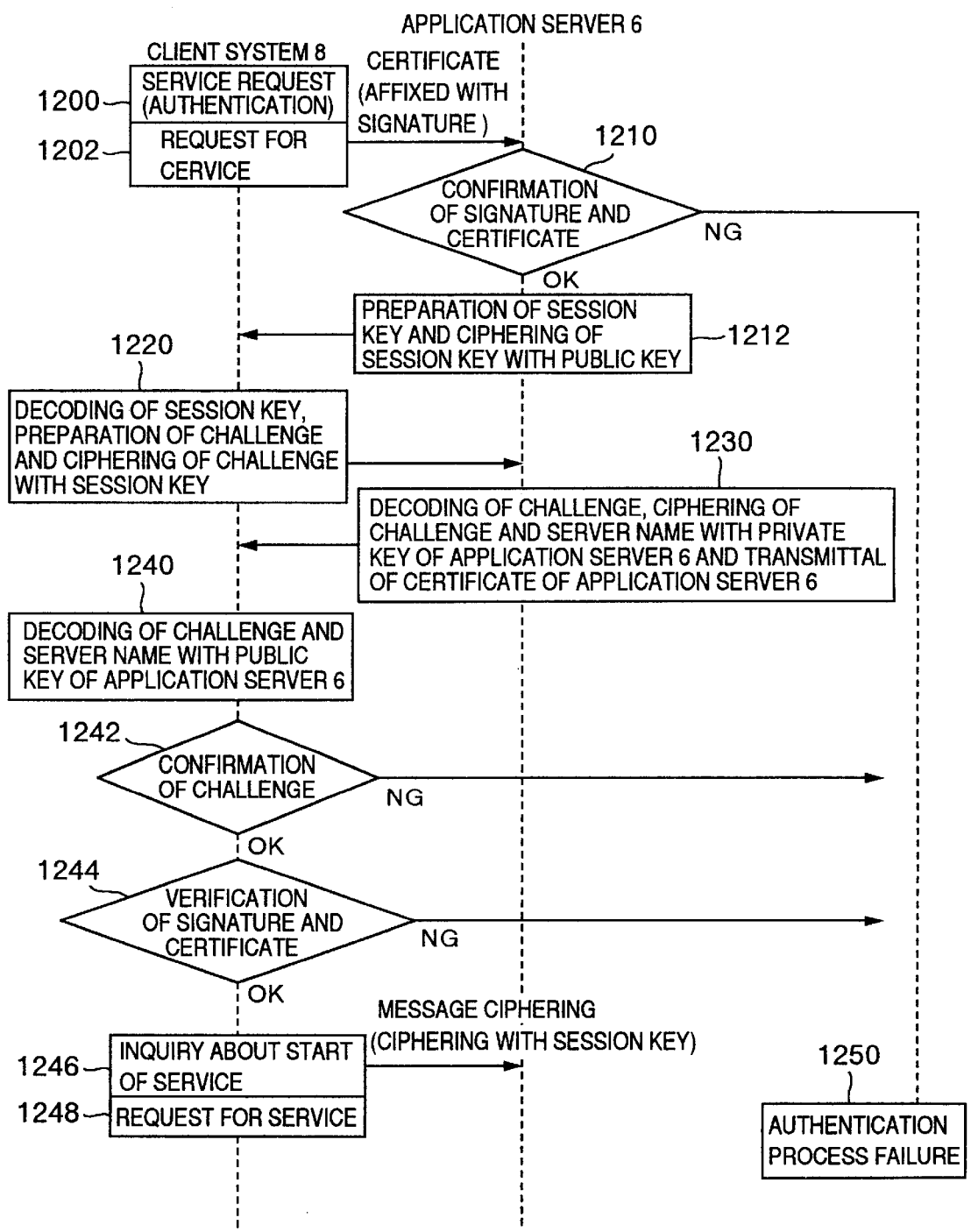
FIG. 12 is a diagram for explaining the mutual authentication between entities concerned in communication and the process of generating a session key in the processing procedure of FIG. 11.

FIG. 12 shows an example of the mutual authentication process carried out between the client 8 and the application server 6 which are persons concerned in communication. The method for mutual authentication conforms to transaction protocol and in the example of FIG. 12, mutual authentication is effected through a scheme in which the certificate and the value of challenge are confirmed.

Firstly, the client 8 affixes an electronic signature of the client to a certificate of a user of the client 8 and sends it to the application server 6 (steps 1200 and 1202). The electronic signature referred to herein is information obtained by ciphering, with a private key of the user, a special data string (for example, Hashed value) prepared from a user's name through the Hash function.

The application server 6 extracts the Hashed value by decoding the received signature with a public key of the user included in the certificate. Then, the application server 6 actually prepares a value from the user's name through the Hash function and verifies whether the value coincides with the received Hashed value. Further, the application server 6 confirms whether the received certificate is valid (step 1210) and if results of all confirmation operations are correct, the application server 6 authenticates the user of the client 8.

Next, the application server 6 prepares a session key and ciphers it with the public key of the user and then, transmits the ciphered session key (step 1212). The client 8 extracts the session key by decoding the received information with the private key of the user (step 1220).

Then, the client 8 ciphers a random number (challenge) prepared by itself with the session key and transmits it to the application server 6 (step 1220). The application server 6 extracts the challenge by decoding the received information with the session key (step 1230). The application server 6 ciphers the challenge and a server name with the private key of the application server 6 itself and transmits them, together with a certificate of its own, to the client 8 (step 1230). The client 8 extracts the challenge by decoding the received information with the public key of the application server 6 included in the certificate of the application server 6 (step 1240) and confirms whether the challenge coincides with the information transmitted by itself to the application server 6 (step 1242). Further, the client 8 inspects the electronic signature affixed to the application server name and if results of all confirmation operations are correct, the client 8 authenticates the application server 6 (step 1244) and starts a service between the client 8 and the application server 6 (steps 1246 and 1248). If any of the confirmation results is incorrect, an authentication process failure results (step 1250).

Figure 13:
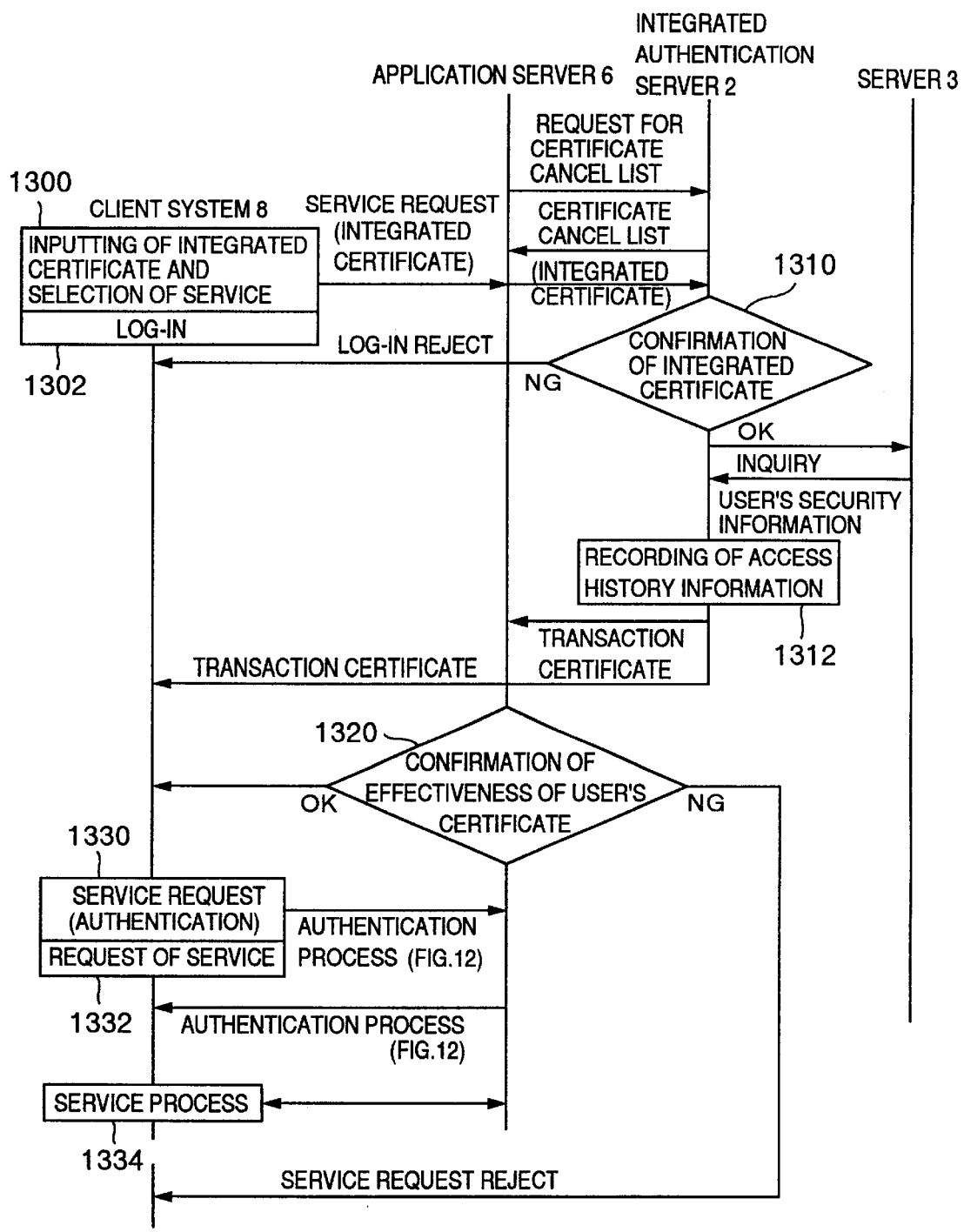
FIG. 13 is a diagram for explaining the processing procedure in which an entity concerned in communication manages a certificate and confirms the validity of the certificate on the basis of the latest certificate revocation list.

FIG. 13 shows an example of the processing in which the validity confirmation and transmission processes of a certificate is carried out by an entity concerned in communication instead of the integrated authentication server 2.

FIG. 13 differs from FIG. 11 in that an entity concerned in communication must perform the confirmation of the validity of the certificate, and prior to the authentication process of the certificate, the latest certificate revocation list is down-loaded from the integrated authentication server 2 to confirm whether the certificate of the communication partner is valid. A working may be possible wherein down-loading of the certificate revocation list is automatically carried out and for example, makeup operation of the system, start time of initial service operation or end time of service operation may precedently be designated and down-loading may be effected at the timing of the designated operation.

In FIG. 13, during, for example, daily system makeup, the application server 6 makes to the integrated authentication server 2 a request for a certificate revocation list of a user in connection with a service related to the application server 6 and the application server 6 receives the certificate revocation list from the integrated authentication server 2.

The client 8 displays a service menu on the display unit of the client 8. When the user selects a service of the application server 6 while watching the service menu, an integrated certificate of the user is automatically read out of, for example, an IC card of the user inserted in the client 8 and the integrated certificate is transmitted to the application server 6, together with a request for the selected service (step 1300). At the same time, log-in by the client 8 is initiated (step 1302).

When receiving the service request and the integrated certificate from the client 8, the application server 6 transfers the integrated certificate to the integrated authentication server 2. The integrated authentication server 2 confirms the integrated certificate (step 1310). If the integrated certificate is unauthorized one (NG in step 1310), the integrated authentication server transmits a log-in reject message to the client 8 via the application server 6. If the integrated certificate is authorized one (OK in step 1310), the integrated authentication server 2 makes an inquiry to the server 3 to extract security information of the user. Then, after recording access history information (step 1312), the integrated authentication server 2 transmits a transaction certificate of the user related to the service to the application server 6 and the client 8.

When receiving the transaction certificate from the integrated authentication server 2, the application server 6 compares the received transaction certificate with the already received certificate revocation list to confirm whether the transaction certificate is effective (step 1320). If the effectiveness is confirmed (OK in step 1320), this is informed to the client 8 from the application server 6 and the client 8 makes a request for service (authentication) shown in FIG. 12 to the application server 6 (steps 1330 and 1332). The application server 6 has already confirmed the effectiveness of the certificate of the user in the step 1320 and therefore, executes the authentication process shown in FIG. 12 without performing again confirmation of the validity of the certificate. Thereafter, the client 8 continues the service process mutual with the application server 6 (step 1334). If the validity is not confirmed in the application server 6 (NG in step 1320), the application server 6 rejects the service request by the client 8 in the steps 1330, 1332 and 1334.

While in the sequence diagram of FIG. 13 the certificate revocation list is forwarded to the application server 8, it may be forwarded to both the client 8 and the application server 6. Further, a working may be available in which the certificate revocation list is once sent to the application server 6 and then the application server 6 relays it to the client 8. The certificate revocation list shall conform to various kinds of protocol of electronic transaction. Further, in FIG. 13, confirmation of the integrated certificate may be conducted by the application server 6.

As described above, since the directory server in the wide area network system integrally manages the information concerning resources of the network system by practising the present invention, the integrated authentication server can acquire authentication information, access control information and certificate information of a user from the directory server. Through this, the integrated authentication server can authenticate the user by means of an integrated certificate to control the access by the user and therefore, single sign-on in which the access is permitted by means of the integrated certificate can be realized in the enterprise network system. The integrated authentication server can perform user authentication and access control by means of the integrated certificate and in response to a service request from the user, can transmit an effective certificate to entities concerned in communication. Since the latest certificate revocation list is transmitted even to an entity concerned in communication which manages the certificate by itself, the mutual authentication and ciphering process of communication using the certificate can be guaranteed.

When a user having an integrated certificate makes a request for a service or transaction and an access request by the user is approved, a certificate for the service or transaction is transmitted to an entity concerned in communication. At that time, the integrated authentication server transmits the certificate after confirming the effectiveness of the certificate by checking the latest certificate revocation list and hence, the entity concerned in communication can initiate the service without questioning the effectiveness of the certificate. On the other hand, when the entity concerned in communication performs communication by managing a certificate, the entity concerned in communication must manage the certificate by itself and confirm the validity of the certificate by checking the latest certificate revocation list before initiating the service.

Entities concerned in communication can mutually exchange authentication and session key by using the information of the certificate and in the phase of completion of the authentication, can conduct the process of ciphering communication by using the session key.

When the client cooperates with the integrated authentication server, access conditions of the user can also be supervised.

What is claimed is:

1. A security management method for a network system in which a client, an application server and an integrated authentication server can communicate with each other through a network, said security management method comprising the steps of:

making a service request by transmitting information of a certificate from said client to said application server;

transmitting the information of the certificate from said application server to said integrated authentication server to request said integrated authentication server to confirm said certificate;

confirming, by said integrated authentication server, said certificate and checking a user for right to access said application server; and if valid, transmitting a user ID and a password to said application server to perform, by said application server, authentication based on said user ID and said password, wherein said client records, as access history information, results of security check including a result of the confirmation of said certificate which is executed by said integrated authentication server and said application server between initial log-in to the system and final log-off from the system, a result of checking right to access said application server, a result of authentication of said user ID and said password, and a result of checking the right to access data held by said application server, wherein said integrated authentication server records, as access history information, the result of the confirmation of said certificate and the result of the security check including checking the right to access said application server, and wherein said security management method further comprises the steps of:

transmitting, by said client, said access history information recorded by said client to said integrated authentication server, and receiving, by said authentication server, said access history information recorded by said client, and collating said access history information recorded by said client with said access history information recorded by said authentication server to check whether accessing performed by said client is proper.

2. A security management method for a network system in which a client, an application server and an integrated authentication server can communicate with each other through a network, said security management method comprising the steps of:

making a service request by transmitting information of a certificate from said client to said application server;

confirming, by said application server, said certificate and transmitting the information of said certificate from said application server to said integrated authentication server to request a user ID and a password, checking, by said integrated authentication server, a user for right to access said application server and if valid, transmitting said user ID and said password to said application server; and performing, by said application server, authentication based on said user ID and said password, wherein said client records, as access history information, results of security check including a result of the confirmation of said certificate which is executed by said integrated authentication server and said application server between initial log-in to the system and final log-off from the system, a result of checking the right to access said application server, a result of authentication of said user ID and said password, and a result of checking right to access data held by said application server, wherein said integrated authentication server records, as access history information, the result of the security check including checking right to access said application server, and wherein said security management method further comprises the steps of:

transmitting, by said client, said access history information recorded by said client to said integrated authentication server, and receiving, by said authentication server, said access history information recorded by said client, and collating said access history information recorded by said client with said access history information recorded by said authentication server to check whether accessing performed by said client is proper.

3. A security control method for a network system in which a first computer, a second computer and a third computer can communicate with each other through a network, said security control method comprising the steps of:

making a service request by transmitting information of a certificate from said first computer to said second computer;

transmitting said information of said certificate from said second computer to said third computer to request said third computer to confirm validity of said certificate;

confirming, by said third computer, validity of said certificate, thereby checking whether a user has a right to access a fourth computer;

if said certificate is valid, transmitting a user identification (ID) and password from said third computer to said second computer to permit said first computer to access said fourth computer using said user ID and password;

recording, by said first computer, an access history of said first computer between initial log-in to the system to final log-off from the system as access history information of said first computer;

recording, by said third computer, an access history of said third computer concerning accesses performed by said first computer as access history information of said third computer;

transmitting, by said first computer, said access history information of said first computer to said third computer; and receiving, by said third computer, said access history information of said first computer, and collating said access history information of said first computer with said access history information of said third computer to check whether access performed by said first computer is proper.

4. A security control method according to claim 3, wherein said fourth computer is indirectly connected to said first computer.

5. A security control method according to claim 4, wherein said first computer is a client, said second computer is an application server and said third computer is an integrated authentication server.

6. A security control method according to claim 3, wherein said first computer is a client, said second computer is an application server and said third computer is an integrated authentication server.

7. A security control method for validating a certificate in a network system, comprising the steps of:

receiving a service request including information of a certificate from a first computer;

transmitting said information of said certificate to a second computer to request said second computer to confirm validity of said certificate;

receiving from said second computer information indicating whether said certificate is valid, wherein a valid certificate indicates that a user has a right to access a third computer, wherein if said information from said second computer indicates that said certificate is valid, said information includes a user identification (ID) and password for use by said first computer when accessing said third computer, recording, by said first computer, an access history of said first computer between initial log-in to the system to final log-off from the system as access history information of said first computer;

recording, by said third computer, an access history of said third computer concerning accesses performed by said first computer as access history information of said third computer;

transmitting, by said first computer, said access history information of said first computer to said third computer; and receiving, by said third computer, said access history information of said first computer, and collating said access history information of said first computer with said access history information of said third computer to check whether access performed by said first computer is proper.

8. A security control method according to claim 7, wherein said third computer is indirectly connected to said first computer.

9. A security control method according to claim 8, wherein said first computer is a client and said second computer is an integrated authentication server.

10. A security control method according to claim 7, wherein said first computer is a client and said second computer is an integrated authentication server.

11. A processing apparatus for use in a network system in which a plurality of processing apparatuses can communicate with each other through a network, said processing apparatus comprising:

a processing unit which receives a service request including information of a certificate from a first processing apparatus, transmits said information of said certificate to a second processing apparatus to request said second processing apparatus to confirm validity of said certificate, and receives from said second processing apparatus information indicating whether said certificate is valid, wherein a valid certificate indicates that a user has a right to access a third processing apparatus, wherein if said information from said processing apparatus indicates that said certificate is valid, said information from said second processing apparatus includes a user identification (ID) and password for use by said first processing apparatus when accessing said third processing apparatus, wherein said first processing apparatus records an access history of said first processing apparatus between initial log-in to the system to final log-off from the system as access history information of said first processing apparatus;

wherein reordering, said third processing apparatus records an access history of said third processing apparatus concerning accesses performed by said first processing apparatus as access history information of said third processing apparatus;

wherein said first processing apparatus transmits said access history information of said first processing apparatus to said third processing apparatus, and wherein said third processing apparatus receives said access history information of said first processing apparatus, and collates said access history information of said first processing apparatus with said access history information of said third processing apparatus to check whether access performed by said first processing apparatus is proper.

12. A processing apparatus according to claim 11, wherein said third processing apparatus is indirectly connected to said first processing apparatus.

13. A processing apparatus according to claim 12, wherein said processing apparatus is an application server, said first processing apparatus is a client and said second processing apparatus is an integrated authentication server.

14. A processing apparatus according to claim 11, wherein said processing apparatus is an application server, said first processing apparatus is a client and said second processing apparatus is an integrated authentication server.

15. A computer program stored on a computer readable storage medium for performing security control in a network system in which a first computer, a second computer and third computer can communicate with each other through a network, said computer program, when executed, causes a computer to perform the steps of:

making a service request by transmitting information of a certificate from said first computer to said second computer;

transmitting said information of said certificate from said second computer to said third computer to request said third computer to confirm validity of said certificate;

confirming, by said third computer, validity of said certificate, thereby checking whether a user has a right to access a fourth computer;

if said certificate is valid, transmitting a user identification (ID) and password from said third computer to said second computer to permit said first computer to access said fourth computer using said user ID and password;

recording, by said first computer, an access history of said first computer between initial log-in to the system to final log-off from the system as access history information of said first computer;

recording, by said third computer, an access history of said third computer concerning accesses performed by said first computer as access history information of said third computer;

transmitting, by said first computer, said access history information of said first computer to said third computer; and receiving, by said third computer, said access history information of said first computer, and collating said access history information of said first computer with said access history information of said third computer to check whether access performed by said first computer is proper.

16. A computer program according to claim 15, wherein said fourth computer is indirectly connected to said first computer.

17. A computer program according to claim 16, wherein said first computer is a client, second computer is an application server and said third computer is an integrated authentication server.

18. A computer program according to claim 15, wherein said first computer is a client, second computer is an application server and said third computer is an integrated authentication server.

19. A computer program stored on a computer readable storage medium for performing security control by validating a certificate in a network system, said computer program, when executed, causes a computer to perform the steps of:

receiving a service request including information of a certificate from a first computer;

transmitting said information of said certificate to a second computer to request said second computer to confirm validity of said certificate;

receiving from said second computer information indicating whether said certificate is valid, wherein a valid certificate indicates that a user has right to access a third computer, wherein if said information from said second computer indicates that said certificate is valid, said information from said second computer includes a user identification (ID) and password for use by said first computer when accessing said third computer;

recording, by said first computer, an access history of said first computer between initial log-in to the system to final log-off from the system as access history information of said first computer;

recording, by said third computer, an access history of said third computer concerning accesses performed by said first computer as access history information of said third computer;

transmitting, by said first computer, said access history information of said first computer to said third computer; and receiving, by said third computer, said access history information of said first computer, and collating said access history information of said first computer with said access history information of said third computer to check whether access performed by said first computer is proper.

20. A computer program according to claim 19, wherein said third computer is indirectly connected to said first computer.

21. A computer program according to claim 19, wherein said first computer is a client and said second computer is an integrated authentication server.

22. A computer program according to claim 21, wherein said first computer is a client and said second computer is an integrated authentication server.

23. A network system comprising:

a network; and a plurality of computers capable of communicating with each other through said network, wherein a first computer makes a service request by transmitting information of a certificate from said first computer to a second computer, wherein said second computer, in response to said service request, transmits said information of said certificate to a third computer to request said third computer to confirm said validity of said certification, wherein said third computer, in response to said information of said certificate, confirms validity of said certificate by checking whether a user has right to a access a fourth computer, wherein said third computer, if said certificate is valid, transmits a user identification (ID) and password to said second computer to permit said first computer to access said fourth computer using said user ID and password, wherein said first computer records an access history of said first computer between initial log-in to the system to final log-off from the system as access history information of said first computer, wherein said third computer records an access history of said third computer concerning accesses performed by said first computer as access history information of said third computer, wherein said first computer transmits said access history information of said first computer to said third computer, and wherein said third computer receives said access history information of said first computer, and collates said access history information of said first computer with said access history information of said third computer to check whether access performed by said first computer is proper.

24. A network system according to claim 23, wherein said fourth computer is indirectly connected to said first computer.

25. A network system according to claim 24, wherein said first computer is a client, said second computer is an application server and said third computer is an integrated authentication server.

26. A network system according to claim 23, wherein said first computer is a client, said second computer is an application server, and said third computer is an integrated authentication server.

* * * * *